US007746217B2

(12) United States Patent
Slatter et al.

(10) Patent No.: US 7,746,217 B2
(45) Date of Patent: Jun. 29, 2010

(54) READING FROM AND WRITING TO MEMORY TAGS

(75) Inventors: David Neil Slatter, Bristol (GB); James Thomas Edward McDonnell, Bristol (GB)

(73) Assignee: Hewlett-Packard Development Company, L.P., Houston, TX (US)

( * ) Notice: Subject to any disclaimer, the term of this patent is extended or adjusted under 35 U.S.C. 154(b) by 891 days.

(21) Appl. No.: 10/573,444

(22) PCT Filed: Sep. 27, 2004

(86) PCT No.: PCT/EP2004/052320

§ 371 (c)(1),
(2), (4) Date: Nov. 20, 2006

(87) PCT Pub. No.: WO2005/031555

PCT Pub. Date: Apr. 7, 2005

(65) Prior Publication Data

US 2007/0084920 A1    Apr. 19, 2007

(30) Foreign Application Priority Data

Sep. 27, 2003    (GB)    ................. 0322697.4

(51) Int. Cl.
   *H04Q 5/22*    (2006.01)
(52) U.S. Cl. .................... 340/10.51; 345/179
(58) Field of Classification Search ............ None
   See application file for complete search history.

(56) References Cited

U.S. PATENT DOCUMENTS

| 4,012,716 | A | * | 3/1977 | Herrin | ............ 235/462.19 |
|---|---|---|---|---|---|
| 4,750,151 | A | * | 6/1988 | Baus | ............ 700/90 |
| 5,442,348 | A | * | 8/1995 | Mushell | ............ 340/932.2 |
| 6,002,387 | A | * | 12/1999 | Ronkka et al. | ............ 345/157 |
| 6,056,199 | A | | 5/2000 | Wiklof et al. | |
| 6,119,944 | A | * | 9/2000 | Mulla et al. | ............ 235/472.03 |
| 6,346,885 | B1 | * | 2/2002 | Curkendall | ............ 340/572.4 |
| 6,563,494 | B1 | * | 5/2003 | Eichstaedt et al. | ............ 345/179 |
| 6,795,060 | B2 | * | 9/2004 | Rekimoto et al. | ............ 345/173 |
| 7,110,576 | B2 | * | 9/2006 | Norris et al. | ............ 382/119 |
| 7,456,826 | B2 | * | 11/2008 | Jurisch et al. | ............ 345/179 |
| 2002/0047867 | A1 | * | 4/2002 | Mault et al. | ............ 345/810 |

FOREIGN PATENT DOCUMENTS

| EP | 0 987 646 A2 | 3/2000 |
|---|---|---|
| GB | 2 274 009 A | 7/1994 |
| GB | 2 360 862 A | 10/2001 |
| JP | 09-034638 | * 2/1997 |
| WO | WO03/073368 A2 | 9/2003 |

* cited by examiner

*Primary Examiner*—Daniel Wu
*Assistant Examiner*—Brian Wilson

(57) ABSTRACT

The reading of data from a memory tag to another device, using a memory tag reader, is described. The other device has an active portion which can detect the presence and position of the memory tag reader when brought adjacent to it. The memory tag reader is brought adjacent to the memory tag and data uploaded into the memory tag reader. The memory tag reader is moved adjacent to the active portion of the other device into a position which identifies the location to which the data is to be transferred. The data is then downloaded into that location in the other device. A similar process is described for downloading data from the other device to the memory tag. Apparatus appropriate to carry out each stage of these processes is described.

27 Claims, 7 Drawing Sheets

READING FROM AND WRITING TO MEMORY TAGS

FIELD OF THE INVENTION

The invention relates to a method of transferring data from a memory tag to another device and to apparatus for reading data from memory tags and in some cases also for writing data to such tags.

BACKGROUND OF THE INVENTION

Memory tags may most generally be considered as memory devices that are not self-powered but which provide input and or output when powered (rather than only when placed in an appropriate drive, such as a CD). Such memory tags may thus be used in situ in any physical environment where they can be powered.

Existing memory tags typically comprise a transponder (an electrical device designed to receive a specific signal and automatically transmit a specific reply)—Radio Frequency Identification (RFID) tags are one such form of tag. RFID tags come in many forms but all comprise an integrated circuit including a memory, in which in use information can be stored, and a coil which enables the circuit to be interrogated by a reader which also powers it by means of an inductive (wireless) link. Until recently RFID tags have been quite large, due to the frequency they operate at (13.56 MHz) and the size of coil they thus require, and have had very small storage capacities. Such RFID tags have tended to be used in quite simple applications, such as for file tracking within offices or in place of or in addition to bar codes for product identification and supply chain management.

Much smaller RFID tags have also been developed, operating at various frequencies. For example Hitachi-Maxell have developed "coil-on-chip" technology in which the coil required for the inductive link is on the chip rather than attached to it This results in a memory tag in the form of a chip of 2.5 mm square, which operates at 13.56 MHz. This chip is capable of both being read and being written to. In addition Hitachi has developed a memory tag they call a "mu-chip" which is a chip of 0.4 mm square and operates at 2.45 GHz. This chip is written with data during the manufacturing process in Read-Only-Memory (ROM), but is small enough to be embedded in paper.

Many uses of memory tags are already known, as indicated above. However, as the storage capacity of the memory tags increases their uses are becoming more to do with data storage rather than simply as a convenient place to store a single number or very limited data. For example Eastman Kodak Company has proposed a range of applications relating to images, presumably intended for use with photographic images, whereby data relating to the images is stored in RFID tags connected to the substrate on which the photographs are printed, e.g. as disclosed in EP 1 076 316 A2 and U.S. Pat. No. 6,363,239 B1.

Many forms of readers and reader/writers for communication with memory tags are also known. Some are wireless and hand held but simply display the limited information read from the tag on a small screen, such as those used to read the tags implanted into pet animals. Others, such as those manufactured by TEK Industries, Inc. and apparently intended for use in supply chain management, are wireless and hand held and store the information from a number of memory tags in internal memory before being downloaded to computer using a cradle or alternative connection technique using additional apparatus. Other readers, also available from TEK Industries, Inc. and capable of writing as well as reading, couple to a personal digital assistant (PDA) to form a single hand held unit and communicate (for example the TEK Stationary Reader) immediately with the PDA. Yet other forms of readers and reader/writers are known which are integral with large fixed equipment such as printers, or are simply hardwired to a computer.

The invention provides assistance in making practical use of the developments in RFID technology, and indeed in any other memory tag technologies, in relation to the ease with which data stored in the memory tags may be read and transferred elsewhere.

SUMMARY OF THE INVENTION

In one aspect there is provided a method of transferring data from a memory tag to another device, using a memory tag reader, wherein the other device has an active portion which can detect the presence and position of the memory tag reader when brought adjacent to it, the method comprising the steps of: bringing the memory tag reader adjacent to the memory tag; uploading the data into the memory tag reader; moving the memory tag reader adjacent to the active portion of the other device into a position which identifies the location to which the data is to be transferred, and downloading the data into that location in the other device.

According to a second aspect of the invention there is provided a method of transferring data to a memory tag from another device, using a memory tag reader/writer, wherein the other device has an active portion which can detect the presence and position of the memory tag reader/writer when brought adjacent to it, the method comprising the steps of: identifying the data to be transferred, bringing the memory tag reader adjacent to the active portion of the other device; uploading the data into the memory tag reader, moving the memory tag reader adjacent to the memory tag, and downloading the data into the memory tag.

According to a third aspect of the invention there is provided a reader to read data from a memory tag and transfer it to another device, having a memory in which to store the data temporarily once read from the memory tag, wherein the reader is responsive to a download instruction from another device to which it is adjacent to download the data read from the memory tag.

According to a fourth aspect of the invention there is provided apparatus for transferring data from a memory tag to another device, comprising a memory tag reader having a memory in which to store the data temporarily once read from the memory tag and an active portion of the other device which can detect the presence and position of the memory tag reader when brought adjacent to it.

According to a fifth aspect of the invention there is provided apparatus for transferring data to a memory tag from another device, comprising a memory tag reader/writer having a memory in which to store the data temporarily once read from the other device and an active portion of the other device which can detect the presence and position of the memory tag reader/writer when brought adjacent to it.

BRIEF DESCRIPTION OF THE DRAWINGS

The invention will now be described, by way of example only, with reference to the accompanying drawings in which.

DETAILED DESCRIPTION OF THE PREFERRED EMBODIMENTS

Figure 1:
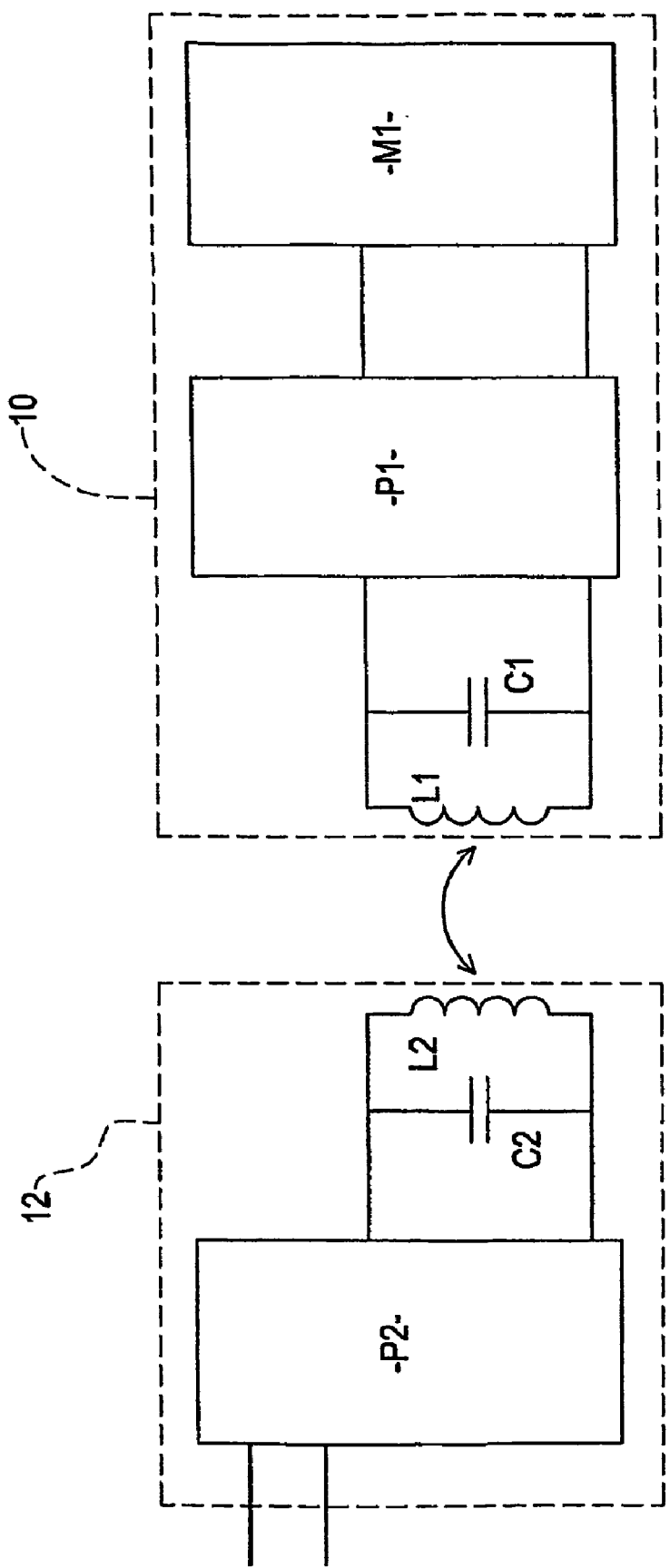
FIG. 1 schematically illustrates a memory tag and a read/write device as known in the prior art.

Referring to FIG. 1 the basic operation of a RFID-type memory tag 10 and of a basic read/write device 12 will be described. The memory tag 10 includes an antenna coil L1 and a capacitor C1 connected in parallel therewith to form a resonant circuit. It further includes a memory M1 and processing and power circuit P1. The read/write device 12 includes an antenna coil L2 and a capacitor C2 in parallel therewith to form a resonant circuit, and a processing and signal generating circuit P2.

A signal generator with in P2 generates a signal at the chosen frequency, such as 2.45 GHz, this is applied to the antenna coil L2 and thus generates an electro-magnetic field which, provided the memory tag 10 is sufficiently close to the read/write device 12, penetrates the antenna coil L1 of the memory tag 10. By induction a voltage is thus generated in the antenna coil L1, this is rectified in circuit P1 and used to power the memory tag 10. The capacitance of the capacitors C1 and C2 is selected such that the resonant circuits are both resonant at the frequency generated by the signal generator, in order to maximise transmitted signal strength and received signal.

When data is to be written to the memory tag 10 by the read/write device 12 the radio frequency signal generated in P2 is modulated, e.g. amplitude modulated, with the data before being applied to the antenna coil L2 and transmitted. The signal received by the memory tag 10 by inductive coupling thus both powers the memory tag 10 and communicates with it, the circuit P1 separating the data signal from the carrier and passing data for storage to the memory M.

Similarly, if data is to be read from the memory tag 10 the circuit P1 applies a signal indicative of the data to the antenna coil L1 which is detected, as a result of the inductive coupling, by antenna coil L2 and deciphered in circuit P2 before being passed from the read/write device 12 to where ever it is required. This signal may for example be transmitted using load modulation. In RFID systems such as this the power consumed by the memory tag 10 can be measured as a drop in voltage across the internal resistance of the antenna coil L2 of the read/write device 12. A load resistance within the circuit P1 may be switched on and off, thus altering the power consumed by the memory tag 10 which is then detected as an amplitude modulation of the voltage across the antenna coil L2 of the read/write device 12.

Figure 2:
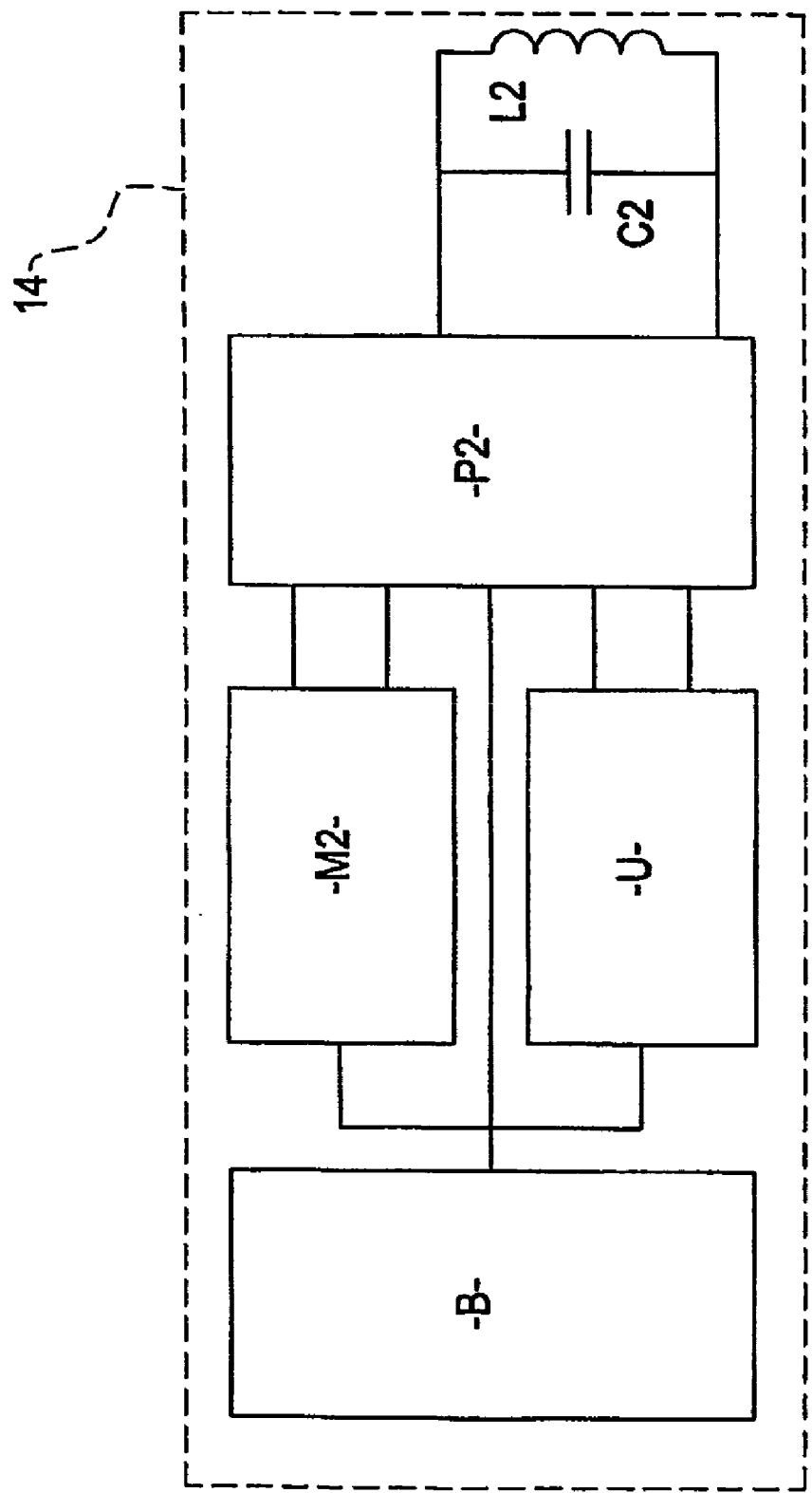
FIG. 2 schematically illustrates a first embodiment of a read or read/write device according to the invention.

Referring now to FIG. 2, a read device (or reader) 14 according to the invention will be described. In addition to the functional units described above with reference to FIG. 1, those parts being like referenced in FIG. 2, the read device 14 includes a memory M2, a communication unit U and a battery B as it is a hand held wireless device. Conveniently the read device 14 has a physical shape not dissimilar to a pen.

The read device 14 is configured such that when it is switched on, and brought adjacent to a memory tag 10, the drop in voltage across L2 is detected and the processor P2 automatically reads data from the memory M1 of the memory tag 10 as described above. The data thus read is stored in the memory M2 of the read device 14.

Figure 3:
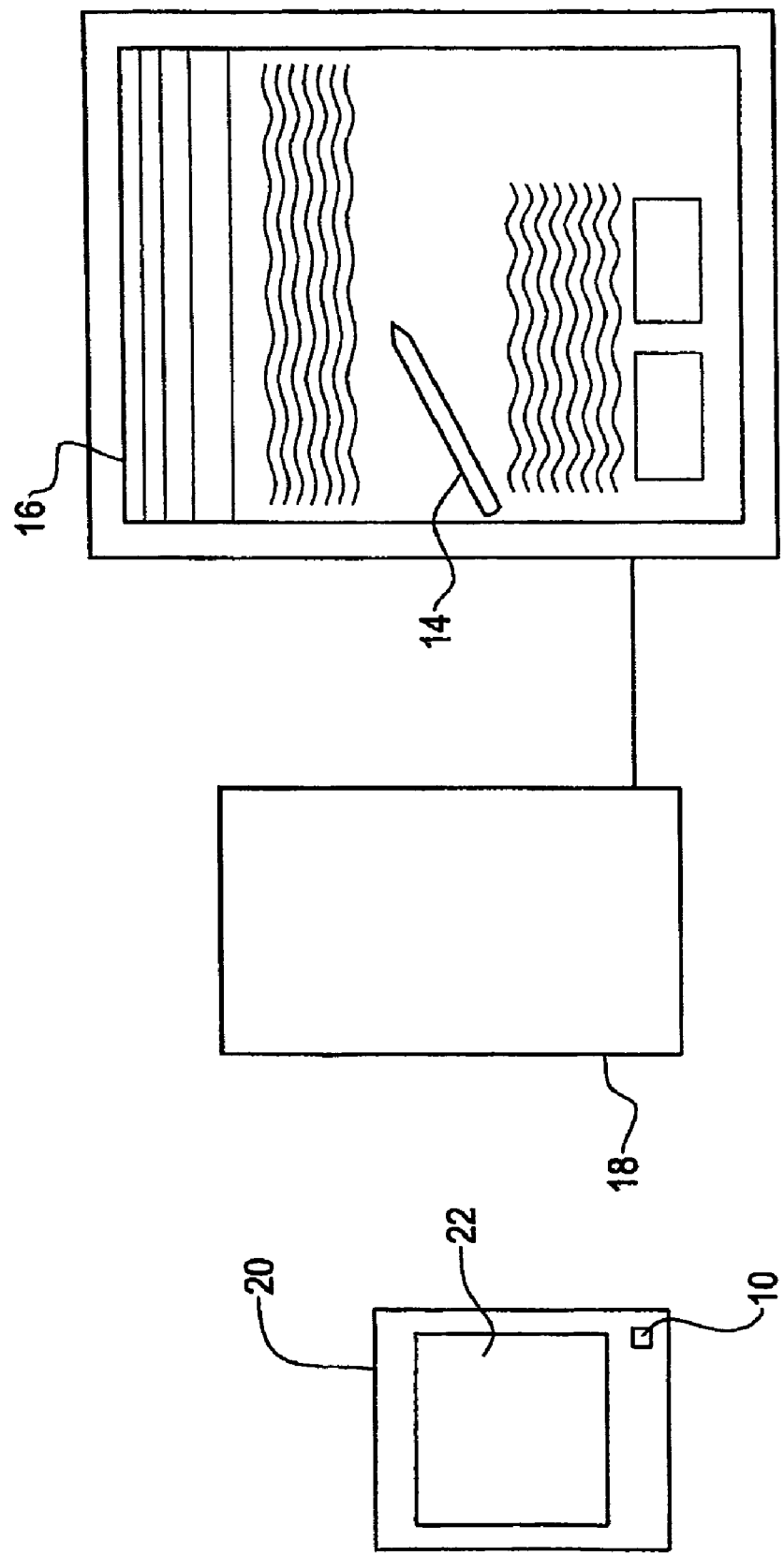
FIG. 3 schematically illustrates the embodiment of FIG. 2 in use.

When it is desired to download the data from the memory M2 of the read device 14, the read device 14 is brought adjacent to a touch sensitive screen 16 of a PDA, personal computer (PC) or other computer 18, as shown in FIG. 3, and then the screen 16 is touched at a location to indicate where the data in the memory M2 should be downloaded to, e.g. into a particular file, or into a particular location in a document The computer 18 is configured to detect the read device 14 touching, or being located adjacent to, the screen 16 and in response to trigger the download of the data from the memory M2. The communication between the read device 14 and the computer 18 is via the communication unit U and by any appropriate wireless means, of which a number are known, such as infra red, or Bluetooth.

Figure 4:
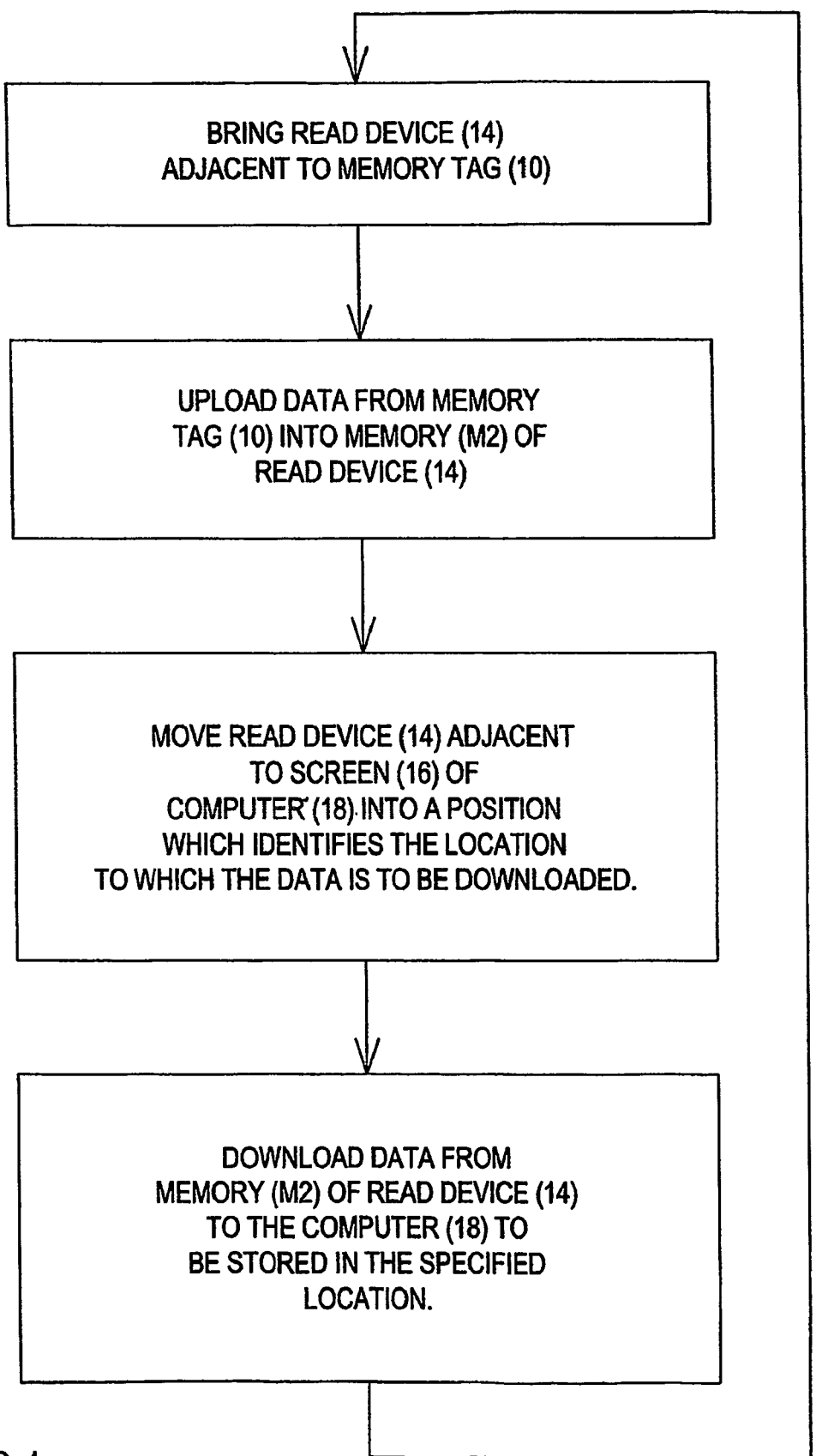
FIG. 4 illustrates the method of transfer of data from the memory tag to the computer for the embodiment of FIGS. 2 and 3.

The method of transferring data from the memory tag 10 to the computer 18 is illustrated by the flow diagram of FIG. 4.

The method may be implemented as follows. The computer 18 will run some form of windows management software, such as Microsoft Windows® which will typically include software to interface with a stylus intended for use with the computer 18 and its screen 16. Such software is also generally able to support alternative special function human interface devices, such as the read device 14, but if not special interface software may be provided. When the read device 14 is brought into contact with the screen 16 it will initially act as the stylus intended for use with the computer 18. That is the location of the read device 14 will be detected and passed to the program controlling the relevant window. This will cause that program to select the object displayed at the relevant location on the screen 16 as the target of an operation, in this case the insertion point for the data being downloaded from the memory M2 of the read device 14, and the triggering of that download by causing the computer 18 to send an appropriate instruction to the read device 14. The download from the read device 14 is conveniently triggered when the read device 14 is moved from contact with the screen 16, as this will cause a change in the status of the screen 16 which will be detected by the relevant program (the stylus driver). Thus the stylus driver interrogates the read device 14 over the wireless link, via the communication unit U and processor P, as described above and co-ordinates the download of the data into the computer 18.

As described above the read device 14 is just that, as far as the memory tag 10 is concerned, a read device, but it may readily also be configured to write whatever is in its memory M2 to a memory tag 10, in which case it will be a read/write device. The data in the memory M2 may have been read from another memory tag 10, as described previously, or may have been uploaded from a computer 18. In the latter case this may conveniently operate as follows. The data to be uploaded is highlighted on the screen 16 of the computer 18, and may for example be a section of a document or a whole document. The highlighting may be undertaken by a combination of key strokes and/or use of the mouse, or other interface device. Alternatively the read/write device 14 may be used to highlight the relevant document or portion thereof by touching it onto the screen 16 at the start of the portion and dragging it to the end of the portion before lifting off from the screen 16.

If highlighting is undertaken by the former method, the read/write device 14 is then touched onto the screen 16 at the location of the highlighted data and when the read/write device 14 is lifted from the screen 16 this triggers the computer 18 to upload the highlighted data to the memory M2 of the read/write device 14. If the highlighting is undertaken by the latter method, the action of lifting the read/write device 14 from the screen 16 at the end of highlighting the portion for upload, triggers the upload to take place.

The read device or read/write device 14 provides a very simple and convenient method for the transfer of data from a memory tag 10 into a document on a computer, or to transfer it in the other direction into the memory tag 10. Thus for example if the memory tag 10 is located on an image print 20, on which an image 22 might for example be in low resolution as it is purely for library purposes, and contains the full image data in high resolution then the image 22 can readily be placed at a desired location in a document being prepared on the computer 18.

The read/write device 14 described above does have one disadvantage in that when taken adjacent to a memory tag 10 it automatically downloads the contents of its memory M2 to the memory tag 10 and this might overwrite any data already stored there. There is therefore a need for read/write devices over which the user has more control.

Figure 5:
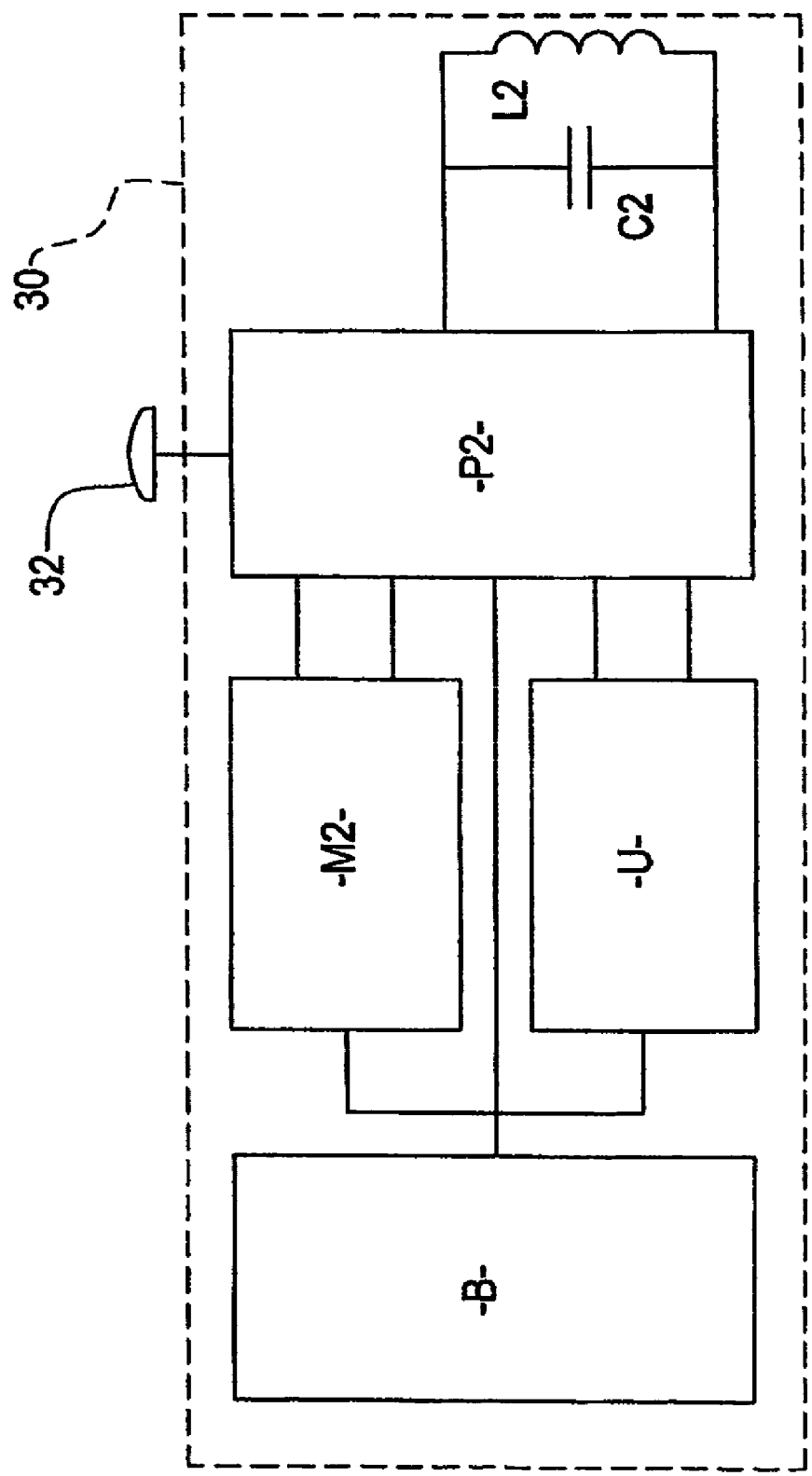
FIG. 5 schematically illustrates a second embodiment of a read/write device according to the invention.

Referring now to FIG. 5, a second embodiment of a read/write device 30 is very similar to the read/write device 14, and like parts are like referenced, but it has in addition a download button 32 on the exterior surface thereof for operation by a user. Thus in using the read/write device 30, as for the device 14, upload of data from the memory tag 10 is triggered automatically when the read/write device 30 is brought close to the memory tag 10, but download of data to a memory tag 10 is not triggered automatically. Instead download is enabled by depression of the download button 32, and then triggered by proximity of the read/write device 30 to the memory tag 10 or alternatively simply triggered by depression of the button 32 when the read/write device 30 is adjacent to the memory tag 10. The download button 32 may also be depressed to enable download of data to the computer 18, although the download may be triggered by removing the read/write device 30 from the screen 16 as previously. This again helps to ensure that data already stored in a particular location is not overwritten accidentally. Uploading of data from a computer 18 to the read/write device 30 will be as described above for the device 14.

Figure 6:
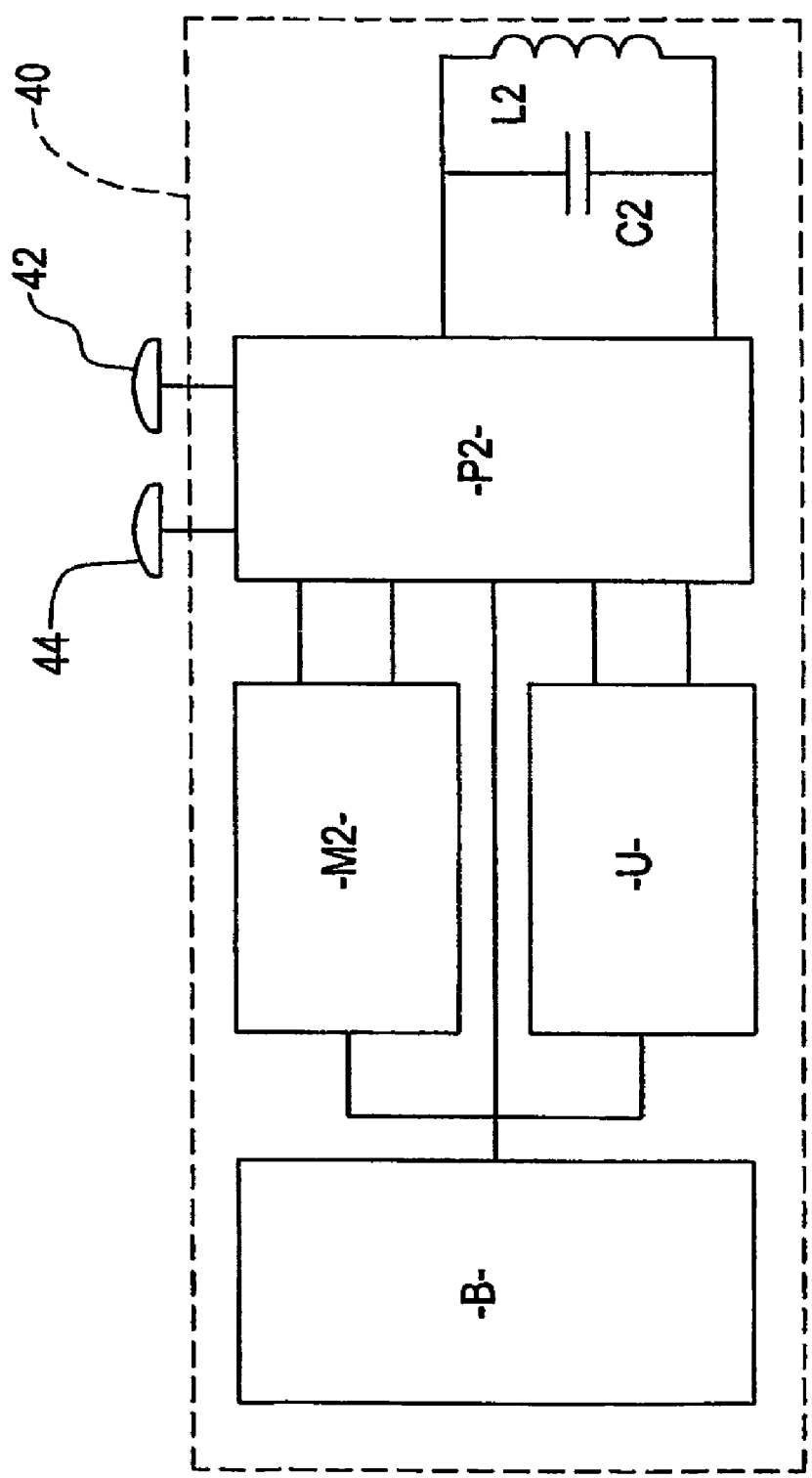
FIG. 6 schematically illustrates a third embodiment of a read/write device according to the invention, and FIG. 7 schematically illustrates a fourth embodiment of a read/write device according to the invention.

Referring now to FIG. 6, a third embodiment of a read/write device 40 is very similar to the read/write device 30, and like internal functional blocks are like referenced, but it has both a download button 42 and an upload button 44 on the exterior surface thereof for operation by a user. Thus in using the read/write device 40 download of data to a memory tag 10 is not triggered automatically when the read/write device 40 is brought close to the memory tag 10 but is enabled by depressing the download button 42. Similarly, when using the read/write device 40 download of data to computer 18 is not triggered automatically when the read/write device 40 is touched onto the screen 16 of the computer 18 but is enabled by depressing the download button 42.

When using the read/write device 40 to upload data, then in a similar fashion, the upload button 44 is depressed to enable (or in some cases trigger) upload of data from a computer 18 for subsequent download to a memory tag 10, or upload of data from a memory tag 10 for subsequent download to a computer 18. The highlighting of data to be uploaded from the computer 18 will be as described previously for the device 14.

Figure 7:
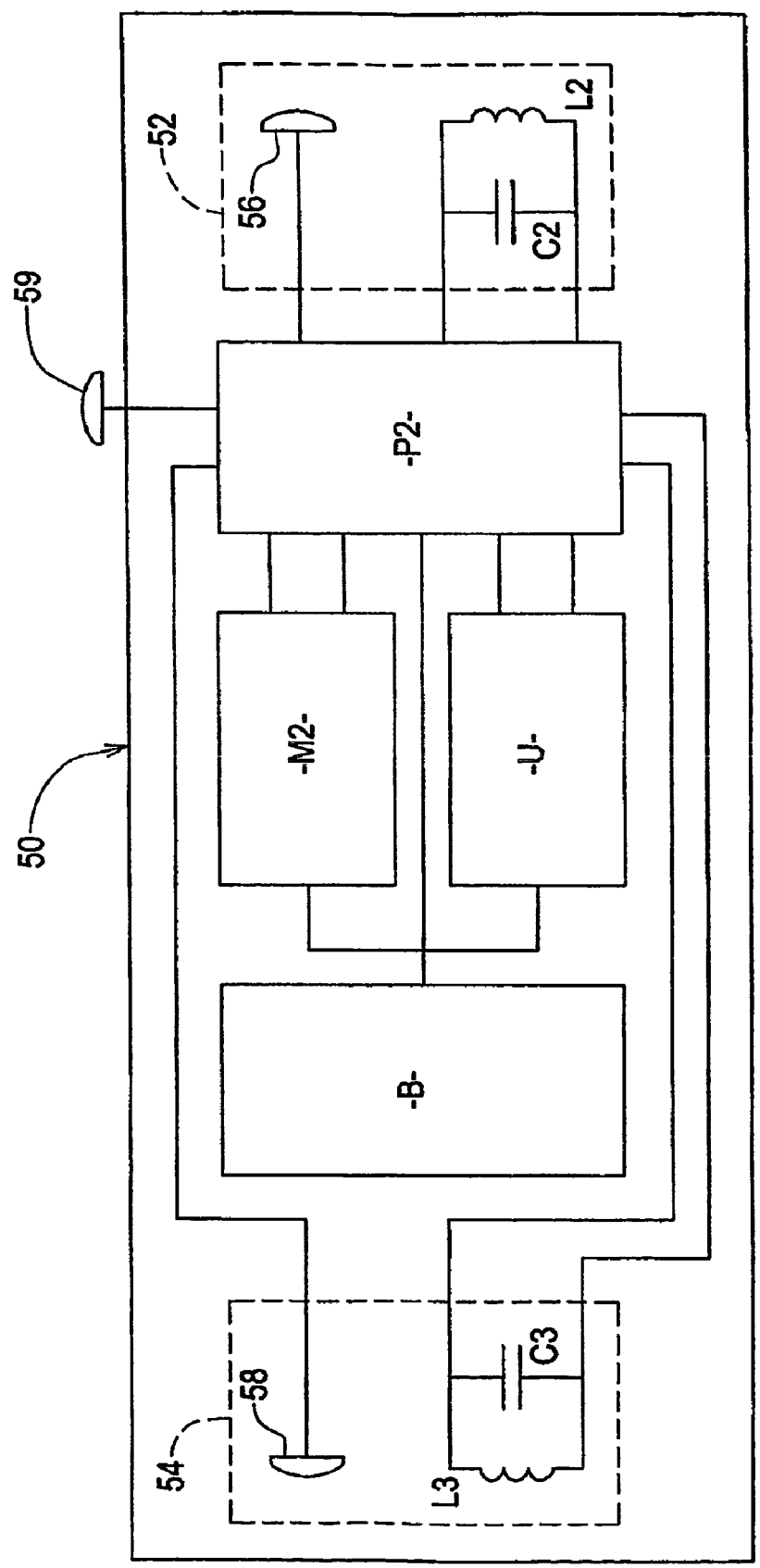

Referring now to FIG. 7, a fourth embodiment of read/write device 50 has similarities to the read/write devices previously described and like internal functional blocks are like referenced. The read/write device 50 has separate read head 52 and write head 54 which are conveniently located at opposite ends of the read/write device 50 and are preferably clearly distinguished visually such as by being different colours or shapes.

The read head 52 includes the antenna coil L2 and capacitor C2 forming a first resonant circuit as previously described, and a first touch sensitive switch 56. The write head 54 includes, in similar fashion, an antenna coil L3 and capacitor C3 forming a second resonant circuit, and a second touch sensitive switch 58.

A single button 59 is provided which may have a variety of uses depending on the programming within the processor P of the read/write device 50. For example write operations may be suppressed unless the button 59 is depressed to enable them.

The read/write device 50 may be used as follows. When the read head 52 is brought adjacent to a memory tag 10 the first resonant circuit L2, C2 couples in the normal manner with the memory tag 10 and data is read into the memory P2 of the read/write device 50. When the read head 52 is brought into contact with the screen 16 of the computer 18 the pressure sensitive switch 56 is activated which signals to the processor P2 that a read operation from the computer 18 is required, and this is then initiated by removing the read/write device 50 from contact with the screen 16. The data to be uploaded form the computer 18 may have been highlighted as previously described, by key strokes or mouse use, or by means of the read/write device 50 being dragged across the screen 16.

When the write head 54 is brought adjacent to a memory tag 10 the first resonant circuit L2, C2 couples in the normal manner with the memory tag 10 and data is written into the memory M1 of the memory tag 10 from the memory P2 of the read/write device 50. When the write head 54 is brought into contact with the screen 16 of the computer 18 the pressure sensitive switch 58 is activated which signals to the processor P2 that a write operation to the computer 18 is required, and this is then initiated by removing the read/write device 50 from contact with the screen 16.

The use of the pressure sensitive switches 56, 58 may also be used in the control of communication between the read/write device 50 and the memory tag 10. In addition the contents of the memory M1 of a memory tag 10 may be deleted by applying the write head 54 of the read/write device 50 to the memory tag 10 when the memory M2 of the read/write device 50 is empty.

The embodiments of read and read/write devices according to the invention described above have been described as downloading the data read from a memory tag to a computer. However, they may alternatively be used to download the data directly to a printer for immediate printing, or to download the data into another memory tag.

Embodiments of read and read/write devices according to the invention may also be constructed which omit the battery and have a connection to an external power source. Furthermore embodiments may be constructed which are not wireless but which are connected to a computer, printer or other device to which the data from memory tags is to be downloaded by a wired connection. However, they would retain the functionality described above whereby the location to which the data is to be downloaded is identified by contact with the screen of the computer or similar contact with the other device. The screen of the computer may not be touch sensitive but may use any of the other known ways of detecting the presence of a read or read/write device.

Embodiments of read and read/write devices according to the invention may also include visual indicators on their external surfaces, such as LEDs which light up or a small LCD screen on which information can be displayed, to communicate the status of the device to a user. The devices may also or alternatively provide audible signals to assist the user, for example they might beep to indicate that a download or upload has been completed.

The invention claimed is:

1. A method of transferring data from a memory tag to another device, using a memory tag reader, wherein the other device has an active portion which can detect the presence and position of the memory tag reader when brought adjacent to it, the method comprising:
   bringing the memory tag reader adjacent to the memory tag, wherein the memory tag is inductively powered;
   uploading the data into the memory tag reader, wherein the data is automatically uploaded to the memory tag reader from the memory tag when the memory tag reader is brought adjacent to the memory tag;
   moving the memory tag reader adjacent to the active portion of the other device into a position which identifies the location to which the data is to be transferred, and
   downloading the data from the memory tag reader into that location in the other device, wherein the downloading automatically occurs when the memory tag reader is lifted from its location adjacent to the active portion of the other device.

2. A method according to claim 1, wherein the data is image data corresponding to an image print.

3. A method according to claim 2, wherein the image data is a high resolution image data.

4. A method according to claim 1, wherein the memory tag reader includes a separate read head and write head.

5. A method according to claim 4, wherein the read head includes a first resonant circuit and the write head includes a second resonant circuit.

6. A method according to claim 1, wherein the active portion of the other device is a screen.

7. A method according to claim 6, wherein the screen is touch sensitive.

8. A method according to claim 1, wherein the other device is a computer or personal digital assistant.

9. A method according to claim 1, wherein the other device is a printer.

10. A method of transferring data to a memory tag from another device, using a memory tag reader/writer, wherein the other device has an active portion which can detect the presence and position of the memory tag reader/writer when brought adjacent to it, the method comprising:
    identifying the data to be transferred;
    bringing the memory tag reader/writer adjacent to the active portion of the other device;
    uploading the data into the memory tag reader/writer, wherein the uploading automatically occurs when the memory tag reader/writer is lifted from its position adjacent to the active portion of the other device;
    moving the memory tag reader/writer adjacent to the memory tag, wherein the memory tag is inductively powered, and
    downloading the data into the memory tag.

11. A method according to claim 10, wherein the data to be transferred is identified by bringing the memory tag reader/writer adjacent to the active portion of the other device and dragging it across the active portion of the other device.

12. A method according to claim 10, wherein the data to be transferred is identified by use of the other device.

13. A method according to claim 10, wherein the downloading to the memory tag only occurs when a download button on the memory tag reader/writer is depressed.

14. A method according to claim 10, wherein the memory tag reader/writer communicates with the other device via a wired connection.

15. A method according to claim 10, wherein the data is automatically downloaded from the memory tag reader/writer when the memory tag reader/writer is brought adjacent to the memory tag.

16. A method according to claim 10, wherein the memory tag reader includes a separate read head and write head.

17. A method according to claim 16, wherein the read head includes a first resonant circuit and the write head includes a second resonant circuit.

18. A method according to claim 10, wherein the active portion of the other device is a screen.

19. A method according to claim 18, wherein the screen is touch sensitive.

20. A method according to claim 10, wherein the other device is a computer or personal digital assistant.

21. A method according to claim 10, wherein the other device is a printer.

22. A system, comprising:
    a memory tag reader configured to read data from a memory tag and having a memory adapted to store the data that has been read from the memory tag, wherein the memory tag is inductively powered, and wherein the data is automatically read by the memory tag reader when the memory tag reader is brought adjacent to the memory tag; and
    a computing device having an active portion configured to detect the presence and position of the memory tag reader when brought adjacent to it, the active portion of the computing device identifying a location in the computing device to which the data is transferred from the memory of the memory tag reader, wherein the data is automatically transferred when the memory tag reader is lifted from a location adjacent to the active portion of the other device.

23. The system as claimed in claim 22, wherein the active portion of the other device is a screen.

24. The system as claimed in claim 23, wherein the screen is touch sensitive.

25. The system as claimed in claim 22, wherein the data is high resolution image data corresponding to an image print.

26. The system as claimed in claim 22, wherein the reader is configured not only to read data from a memory tag but also to write data to a memory tag, and wherein the reader is configured to receive data from the active portion of the computing device for writing to a memory tag.

27. The system as claimed in claim 22, wherein the reader comprises one or more user operable switches to allow user control of transfer of data to or from the reader.

* * * * *